Dec. 15, 1942.   W. C. SKAREEN   2,305,225
MECHANISM CONTROL
Filed April 1, 1941   2 Sheets-Sheet 1

INVENTOR
Willard C. Skareen
BY
Braselton, Whitcomb & Davies

Dec. 15, 1942. W. C. SKAREEN 2,305,225
MECHANISM CONTROL
Filed April 1, 1941 2 Sheets-Sheet 2
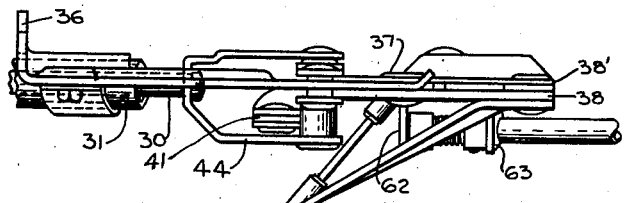
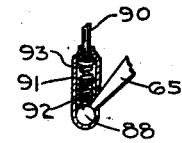
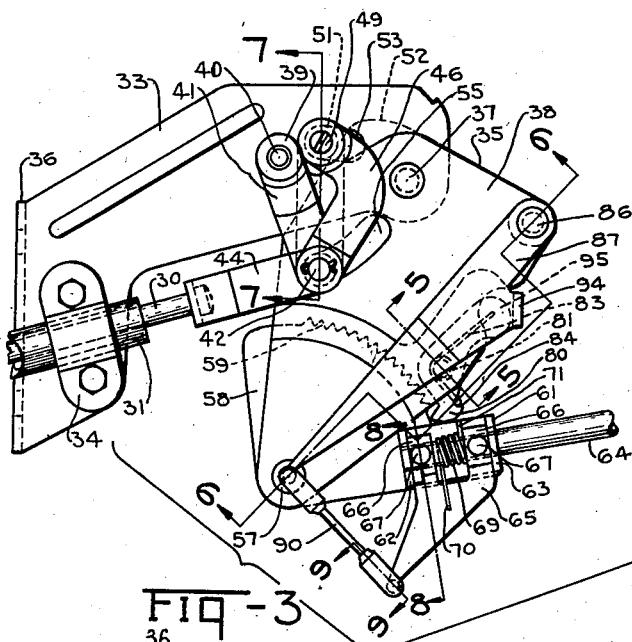
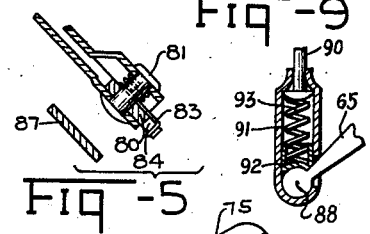
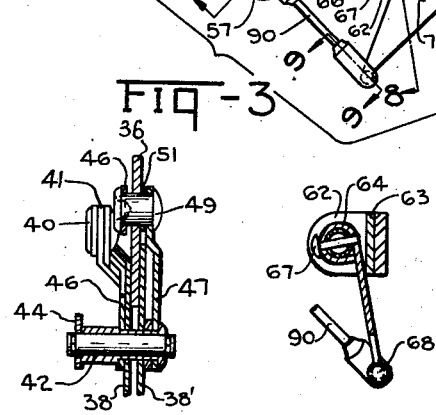
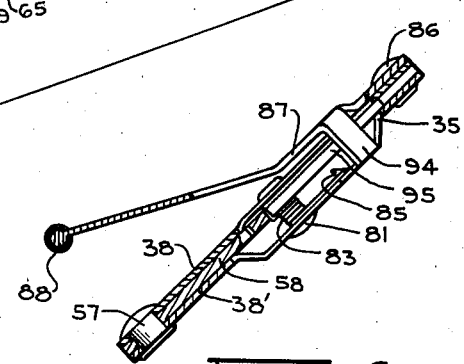
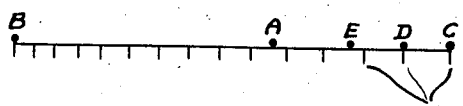
INVENTOR
Willard C. Skareen
BY
Braselton, Whitcomb Davies Patented Dec. 15, 1942

2,305,225

UNITED STATES PATENT OFFICE 2,305,225

MECHANISM CONTROL

Willard C. Skareen, Toledo, Ohio, assignor to The Bingham Stamping Company, Toledo, Ohio, a corporation of Ohio Application April 1, 1941, Serial No. 386,334

8 Claims. (Cl. 74—518)

This invention relates to mechanism controls and more especially to mechanism particularly adapted for controlling or actuating the braking mechanism of an automotive vehicle.

The invention contemplates the provision of a mechanism for actuating the emergency braking means of a vehicle incorporating a varying lever ratio between the manipulating means for actuating the braking means and the mechanism for transmitting force to the braking mechanism.

An important object of the invention resides in the provision of a simple and compact lever system incorporating a variable ratio or force multiplying means whereby as the braking load increases, the load arm of the lever system is effectively shortened with respect to the power arm thus progressively increasing the effective force applicable for actuating the braking means.

Another object of the invention is to provide a mechanism especially adaptable for use in actuating the emergency or parking brakes of an automotive vehicle wherein during a period of primary brake setting movement of the brake actuating means effective to take up the slack in the braking means and associated elements, the lever multiple is of comparatively low ratio and as the load or force required to set the brakes increases, the multiple of applied force is progressively increased to provide a greater effective brake setting force without the application of excessive manipulating power to the actuating means.

Still another object of the invention is the provision of a simple brake actuating mechanism of the variable lever ratio type wherein the manipulating or actuating means may be positioned adjacent the instrument panel of a vehicle and may be actuated by a direct "pull" upon the actuating means and wherein the brake mechanism may be released by partial rotative movement of the said means.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 3 is a side elevational view of the brake actuating mechanism of my invention in "brake released" position;

Figure 4 is a top plan view of a portion of the structure shown in Figure 3;

Figure 5 is a fragmentary detail sectional view taken substantially on the line 5—5 of Figure 3;

Figure 6 is a sectional view taken substantially on the line 6—6 of Figure 3;

Figure 7 is a sectional view taken substantially on the line 7—7 of Figure 3;

Figure 8 is a sectional view taken substantially on the line 8—8 of Figure 3;

Figure 9 is an enlarged fragmentary detail view taken substantially on the line 9—9 of Figure 3;

Figure 10 is a diagrammatic view illustrating the varying leverage of the mechanism during its actuation toward brake setting position.

Figures 1, 2:
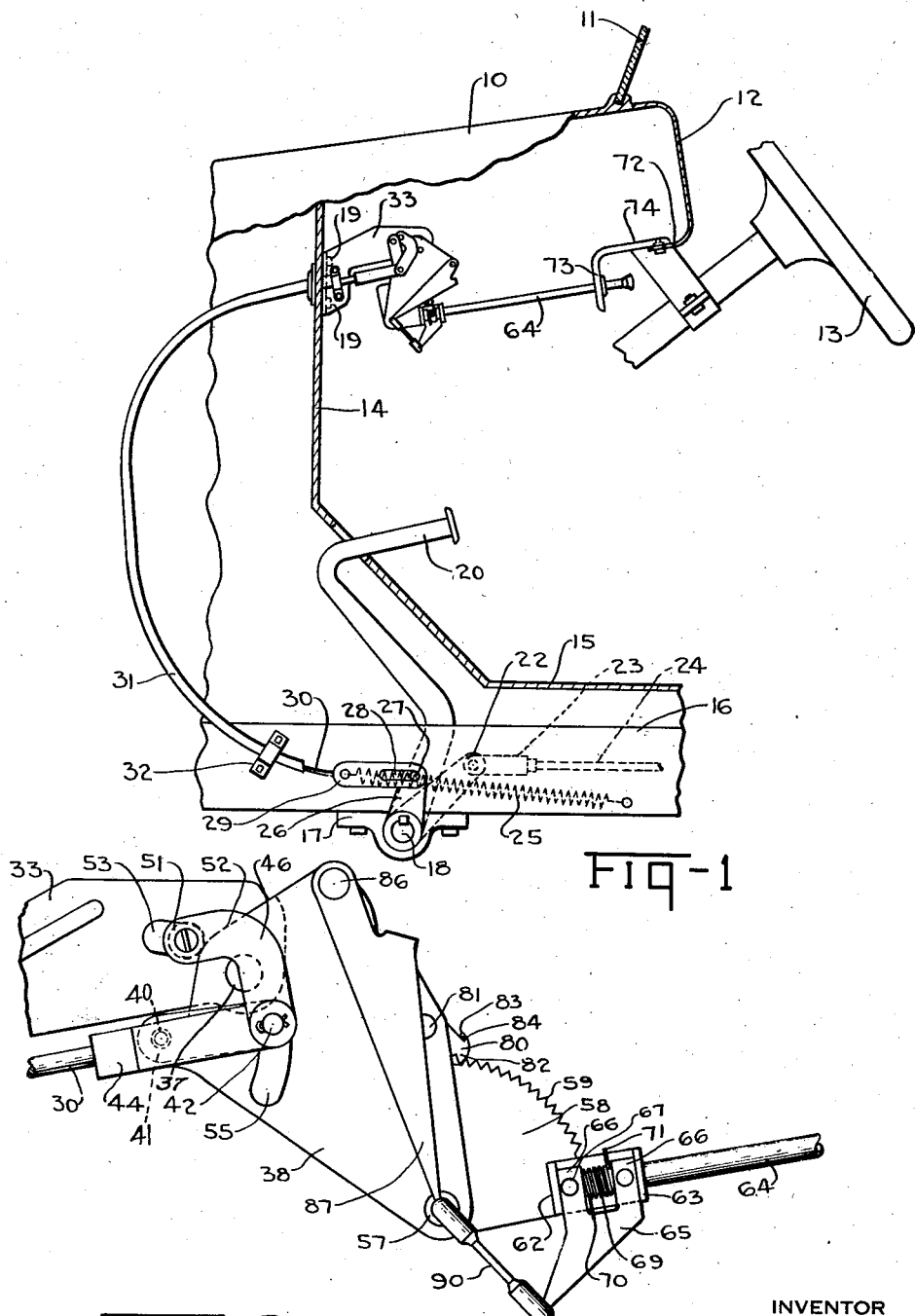
Figure 1 is a sectional view of a portion of a vehicle illustrating a form of my invention as incorporated therein.
Figure 2 is a side elevational view of the brake actuating means of my invention in extreme "brake set" position.

While I have illustrated a mechanism especially designed and adapted for use as means for energizing or setting the brake mechanism of an automotive vehicle, it is to be understood that I contemplate the utilization of the mechanism of my invention wherever the same may be found to have utility.

Referring to the drawings in detail, 10 designates a cowl portion of a vehicle having a windshield 11, conventional instrument panel 12, steering wheel 13, dashboard 14 and floorboard 15 all mounted upon a chassis frame 16. Secured to the chassis frame by means of journals 17 is a transversely extending shaft 18 to which is keyed or otherwise secured a pedal member 20 for normally actuating the braking mechanism through the medium of an arm 22 also secured to the shaft 18, the arm 22 being secured by a clevis 23 and a rod 24 to the brake mechanism of the vehicle (not shown). Also secured to the shaft 18 is a bell crank arm 26 having a pin or stub shaft 27 extending into a slot 28 of a member 29, the extremity of member 29 being secured by suitable means to a flexible cable 30 which is contained within and guided by means of a sheath 31. A spring 25 serves to normally urge member 29 and cable 30 toward "brake released" position. In the embodiment illustrated the sheath is secured to the chassis frame by means of a clamp 32 and extends through the dashboard and is secured to a support or mounting bracket 33 by means of a clamp 34.

The force multiplying mechanism for actuating the brakes is carried by the supporting means 33, the latter having a flange portion 36 which is secured to the dashboard 14 by bolts 19 or to any other suitable portion of the vehicle. Pivoted or fulcrumed upon the support 33 by means of a rivet or shaft 37 is a lever structure formed by two members 38 and 38' arranged in parallel relationship mounted for oscillatory movement around the fulcrum formed by rivet 37. Also pivoted to a projecting arm 39 of lever structure member 38' by means of a shaft or rivet 40 is a link 41, the other end of the link being provided with an opening to accommodate a pin 42 which also passes through openings in the end of a clevis 44, the latter being secured to the upper extremity of the brake actuating cable 30 as particularly shown in Figures 3 and 4. The pin 42 also passes through aligned openings in a pair of members or links 46 and 47 which are respectively arranged adjacent to and on each side of the lever members 38 and 38'. The upper ends of members 46 and 47 have aligned openings to receive a stub shaft or rivet 49. Positioned between the side walls of members 46 and 47 and journalled upon the stub shaft 49 is a roller 51 which is arranged to contact with an edge portion 52 of the lever member 38', the portion 52 being a cam surface for controlling the position of members 46 and 47 and hence the path of movement of the pin 42 with respect to the fulcrum 37 of the lever member for controlling or varying the ratio of the load arm of the lever construction during brake setting actuation of the mechanism. The support 33 is provided with an elongated slot 53 through which the shaft 49 extends and permits the lateral movement of the upper ends of the links 46 and 47 and the roller 51 as the latter is permitted lateral movement under the influence of the cam surface 52. The varying of the effective load arm of the lever construction is accomplished by changing or varying the distance between the axes of pins or shaft 42 and 37 in a manner to be hereinafter explained. The lever members 38 and 38' are provided with aligned arcuate slots 55 generated about the axis of the pin 39 so as to accommodate upward movement of the clevis pin 42 during the varying of the load arm of the lever structure when the mechanism is moved to "brake setting" position.

The component elements 38 and 38' of the lever structure are secured together at their lower extremities by means of a headed rivet or shaft 57 and interposed between the elements 38 and 38' is a member or sector 58 having a clutching surface in the form of a serrated or toothed portion 59, the sector being journalled upon the tenon portion of rivet 57 so as to be capable of pivotal movement with respect to the lever structure 35. Welded or otherwise secured to the sector 58 is a U-shaped bracket 61, the projecting leg portions 62 and 63 thereof having aligned openings through which extends a tubular member 64. Arranged between the ear portions 62 and 63 is a movable bracket 65 having cylindrical boss portions 66 which are bored to accommodate the bar 64, the bracket 65 being fixedly secured to the bar 64 by means of screws 67 or other means passing through the boss portions 66 of the bracket and through openings in the member 64. By this means rotational movement of member or bar 64 will cause corresponding rotational movement of the bracket 65 for a purpose to be hereinafter explained and longitudinal movement of bar 64 will cause a movement of sector 58 as the bracket 61 is secured thereto. A coil spring 69 has its extremities 70 and 71 normally in contact respectively with a surface of the movable bracket 65 and an inner surface of bracket 61 to at all times urge bracket 65 and bar 64 to a predetermined position as illustrated in Figures 2 and 3.

The bar 64 in the embodiment illustrated projects through an opening in a plate or escutcheon 73 which has a portion 74 secured to the flange portion 72 of the instrument panel 12. Positioned in an opening in the escutcheon 73 and surrounding the bar 64 is a flexible rubber grommet 76 which serves a dual purpose of eliminating metallic contact between the bar 64 and escutcheon 73 and permitting slight angular movement of bar 64 with respect to escutcheon 73. Secured to the end of bar 64 by means of a pin 77 and forwardly of the escutcheon plate 73 is a manipulating handle 78, the bar 64 and handle 78 forming a manipulating means for actuating the braking mechanism.

Interposed between the side walls 38 and 38' of the lever structure 35 is a clutch or pawl member 80 pivoted upon a pin 81 passing through the lever elements 38 and 38', the pawl member having a tooth 82 or other configuration adapted to cooperate with the clutch or toothed portion 59 of the sector 58, the pawl tooth being normally urged into engagement with the sector under the influence of a coil spring 83, one end of the spring being in engagement with a notch 84 formed on the pawl, the other end of the spring engaging in a notch 85 formed in the lever element 38'.

Pivotally secured to the lever structure 35 by means of a headed rivet or pin 86 is an arm 87 which terminates in a ball-like portion 88 whose center is in normal transverse alignment with the axis of the pin 57. The projecting portion of the bracket 65 terminates in a ball-like configuration 68 and the ball portions 68 and 88 are connected together by suitable link means 90, a detail of one end of the link construction being shown in Figure 9 wherein the enlarged cylindrical portion 91 encloses a plunger 92 backed by a spring 93, the plunger engaging the ball portion 68 to hold the latter within the socket formed in the end of the enlarged portion 96 of the link structure. The opposite extremity of the link means 90 is of a similar construction and embraces the ball portion 88 formed on the end of the arm 87. By means of the ball and socket link construction for connecting bracket 65 with the arm 87, arm 87 may move in a proper direction when actuated by rotational movement of bracket 65. The arm 87 is provided with an ear portion 94 which is normally positioned adjacent to the upper extremity 95 of the pawl or clutch member 80 so that upon rotational movement of the bracket 65 about the axis of bar 64, arm 87 is rotated about the axis of shaft 86 causing the ear portion 94 to engage pawl 80 to lift the pawl tooth 82 from engagement with the serrated portion 59 of the sector 58.

The operation of the arrangement of my invention is as follows:

Assuming that the mechanism is in "brake released" position as illustrated in Figure 3, and it is desired to set or apply the vehicle brake mechanism, the operator grasps the handle or actuator 78 and by direct outward "pull" upon the rod 64 causes the lever structure 35 to be rotated about its fulcrum or pivotal point 37, as the bar 64 is connected through the medium of bracket 61 and sector 58 to the lever structure by means of shaft 57. The extreme "brake set" position of the several elements of the control mechanism is shown in the assembly arrangement of Figure 2. As the handle member 78 and bar 64 are moved toward the operator and lever structure 35 is being rotated, the link 41 through its pivotal connection 40 with the lever structure and its connection with the clevis 44, the latter being connected directly to the brake cable 30, causes a movement of the clevis and cable in a right hand direction as viewed in Figure 3. The effective force transmitted to the load arm of the lever mechanism is dependent upon the distance between the axes of the fulcrum shaft 37 and the load or clevis shaft 42 as compared with the power arm of the lever system, i. e., the distance between the axis of shafts 37 and 57, the lever structure illustrated being of the second order of levers. It will be noted that as the lever structure is rotated in a counterclockwise direction as viewed in Figure 2, the shaft 42 under the influence of the link 41 moves toward the fulcrum shaft 37 to shorten the lever distance between the axes of shaft 37 and 42 and hence increase the effective force acting upon the brake cable 30 as compared with the power or force exerted upon the handle member 78. In the embodiment illustrated, the effective ratios in initial or "brake released" position between the power arm and the load arm, viz., the ratio of distances between the axes of fulcrum 37 and point of application of the power at shaft 57, and between the fulcrum 37 and clevis pin 42 is approximately in a ratio of 2½ to 1. For about ⅖ of the entire movement of bar 64 toward brake setting position as illustrated on the chart, Figure 10, the lever ratio increases until it reaches approximately a ratio of power arm to load arm of 5 to 1, as indicated at point A in Figure 10, at which point the cam surface 52 being engaged by roller 51 carried on shaft 49 permits lateral movement of shaft 49 in slot 53 in the support and for the balance of the longitudinal movement of the actuating bar 64 maintains substantially a constant lever ratio of power arm to load arm of 5 to 1, that is for the balance of approximately ⅗ of the longitudinal movement of bar 64, the distance between the axes of shafts 37 and 57 as compared with the distance between the axes of shafts 37 and 42 being in substantially a constant ratio of 5 to 1, which is the maximum effective force multiple applied to the brake cable 30 through the mechanism of my invention. Other ratios may be employed however by varying the lengths of the links and lever structure without departing from the spirit of the invention.

The chart shown in Figure 10 illustrates graphically the various positions of the manipulating means with respect to the varying lever ratios. The distance B—C represents the maximum distance of movement of the manipulating means. When the manipulating means has been moved a distance equal to C—D the lever ratio has increased to 3½ to 1, and when moved a distance equal to C—E the ratio has reached 4 to 1, and when it is moved a distance A—C the ratio has increased to 5 to 1. Throughout the movement of the manipulating means through distance A—B, the lever multiple is substantially constant, viz. in a ratio of approximately 5 to 1. The indicia 96 indicate graphically the movement of the manipulating means as the pawl 80 moves over each tooth 59 on the sector 58 as the brake manipulating means is moved toward "brake setting" position.

Thus, when the operator first initiates movement of the handle 78 with the lever ratio of 2½ to 1, the application of fifty pounds pull upon the handle exerts a force upon the brake cable of one hundred and twenty-five pounds. As the handle is withdrawn up to about ⅖ of its maximum movement, the lever ratio has increased gradually from 2½ to 1 to 5 to 1 and when the latter ratio has been attained, the application of fifty pounds pull on handle 78 transfers through the lever system an effective force to the brake cable of two hundred and fifty pounds. By this arrangement during the initial movement of the brake actuator when a low lever ratio is effective, the "slack" between the various elements making up the braking mechanism and looseness of the rods is first taken up quickly by the application of small force. When the brake mechanism is being moved nearer "set" position and a greater amount of force is required to apply the brakes, the additional force is attained through the increase in ratio of the power arm to the load arm as hereinbefore described, so that there is a high effective force directed to the brake cable without an excess application of force upon the handle member 78 and bar 64.

The pawl member or clutch 80 is at all times being urged by the spring 81 in a clockwise direction to cause the pawl tooth 82 to normally engage in the teeth of the serrated portion 59 of the sector 58 which serves to hold the brake setting means of my invention in "brake set" position, the position of the mechanism in extreme brake set position being illustrated in Figure 2. During the period the control mechanism is being actuated, the pawl tooth 82 simply overrides the teeth on the sector 58. When it is desired to release the brake applying mechanism, the operator grasps the handle 78 and rotates the same, bar 64 and bracket 65, and through the medium of the connecting link 90 causes a clockwise rotation of arm 87 about the shaft or rivet 86 causing the ear portion 94 to engage the upper end 95 of pawl 80 and rotate the pawl about its pivotal shaft 81. This movement of the pawl disengages the pawl tooth 82 from the serrated portion 59 of the sector 58, after which operation the braking mechanism may be returned to its normal or disengaged position by inward pressure upon handle 78 and aided by the influence of the retracting spring 25. After the mechanism has been returned to brake disengaged position, that is, the elements being in the position shown in Figure 3, the operator releases handle 78 and the bar 64 and handle 78 rotate to their initial positions under the influence of spring 69 as shown in Figure 3, after which the brakes may be again set by again actuating the lever mechanism as hereinbefore described.

It is apparent that, within the scope of the invention, modifications and different arrangements may be made other than is herein disclosed, and the present disclosure is illustrative merely, the invention comprehending all variations thereof.

What I claim is:

1. In combination, mechanism control including a support; a lever structure pivotally associated with said support; a link pivotally associated with the lever structure; a clevis for connecting said link to a load to be actuated; said link and lever structure being so arranged that relative movement of said lever structure with respect to the support varies the force effective to actuate the load; a toothed sector movably connected to said lever structure; a manipulating bar connected to said sector for actuating the lever structure; clutching means associated with the lever structure and engageable with the toothed surface of said sector for retaining the lever structure in adjusted position; and means associated with said manipulating bar for effecting the disengagement of said clutch with the toothed sector.

2. In combination, mechanism control including a support; a lever structure articulately associated with said support; a cam carried by said lever structure; a link pivotally associated with the lever structure; means for connecting said link to a load to be actuated; a member pivotally associated with said link and having a connection with said cam for moving said link with respect to said lever structure whereby relative movement of said lever structure with respect to said support varies the force effective to actuate the load; cooperative clutch elements associated with said lever structure; manipulating means connected to one of said clutching elements, said clutching elements being arranged to hold the lever structure in adjusted position; and a mechanism associated with said lever structure manipulating means for effecting a disengagement of said clutching means.

3. In combination, mechanism control including a support; a lever structure articulately associated with said support; a link pivotally associated with the lever structure; means for connecting a load to said link; a sector associated with said lever structure and having a clutching surface; a manipulating bar connected to said sector for actuating the lever structure; a clutch means associated with the lever structure and engageable with the clutching surface of said sector for retaining the lever structure in adjusted position; and means for effecting the disengagement of said clutch means with the clutching surface of said sector.

4. In combination, mechanism control including a support; a lever structure articulately associated with said support; a link pivotally associated with the lever structure; means for connecting a load to said link; a second link pivotally associated with said first mentioned link; a roller cooperatively associated with said second link, said lever structure having a cam surface in engagement with said roller for controlling the effective length of the load arm of the lever structure; manipulating means for actuating said lever structure; means for retaining the lever structure in adjusted position; and mechanism associated with said manipulating means for effecting a release of said lever structure retaining means.

5. In combination, a support; a lever structure articulated with said support; a link pivotally connected to said lever structure; a clevis adapted to be connected to a vehicle braking mechanism, said clevis being pivotally connected to said link; a second link pivotally articulated with said first link; a cam surface associated with said lever structure for moving said second mentioned link; said linkage and cam surface being so arranged that movement of said lever structure toward brake setting position variably increases the force applied to said clevis; and means for holding said lever structure in brake setting position.

6. In combination, a support; a lever structure articulated with said support; a link pivotally connected to said lever structure; a clevis adapted to be connected to a braking mechanism, said clevis being pivotally connected to said link; a second link pivotally articulated with said first link; a cam surface on said lever structure; a roller associated with said second link and engageable with the cam surface for controlling the position of said second link; said linkage, roller and cam surface being so arranged that movement of said lever structure toward brake setting position controls the force applied to said clevis; and means for holding said lever structure in brake setting position.

7. In combination, a support; a lever structure articulated with said support; a link pivotally connected to said lever structure; a clevis adapted to be connected to a vehicle braking mechanism, said clevis being pivotally connected to said link; a second link pivotally articulated with said first link; a cam surface on said lever structure for changing the position of said second mentioned link with respect to said lever structure; said linkage being so arranged that movement of said lever structure toward brake setting position variably increases the force applied to said clevis; manipulating means for actuating said lever structure; clutch means for holding said lever structure in brake setting position; and mechanism for effecting a release of said clutch means.

8. In combination, a support; a lever structure articulated with said support; a link pivotally connected to said lever structure; a clevis adapted to be connected to a braking mechanism, said clevis being pivotally connected to said link; a second link pivotally articulated with said first link; a cam surface on said lever structure; a roller associated with said second link and engageable with said cam surface for controlling the position of said second link; said linkage, roller and cam surface being so arranged as to vary and control the application of force to said clevis; a member pivotally articulated with said lever structure; manipulating means for said lever structure connected to said pivoted member; clutch means cooperating with said pivoted member for holding said lever structure in brake setting position; and mechanism associated with said manipulating means for effecting a release of said clutch means.

WILLARD C. SKAREEN.